Patented June 11, 1940

2,204,272

UNITED STATES PATENT OFFICE 2,204,272

ANTIGEN FOR DETERMINATION OF TUBERCULOSIS AND PROCESS OF MAKING THE SAME

Benjamin Gruskin, Philadelphia, Pa., assignor to Lakeland Foundation, Chicago, Ill., a corporation of Illinois No Drawing. Application April 25, 1938, Serial No. 204,136

18 Claims. (Cl. 167—78)

The present invention relates to a substance commonly referred to as an antigen or sensitizing, and more specifically to an agent for the diagnostic determination of a diseased condition in an animal.

The present invention is a continuation in part of my co-pending application, Serial No. 39,733, filed September 9, 1935.

The present invention contemplates the provision of an antigen, as well as a process for making and using the antigen, for the diagnostic determination of the existence of active tuberculosis in a living animal organism and particularly in a human being.

It is an object of the present invention to provide an antigen and method for determination of tuberculosis in a human which involves an intradermal injection and wherein the tests may be made quickly with substantially no discomfort or annoyance to the patient.

Another object of the present invention is to provide an antradermal test as above for the diagnostic determination of active tuberculosis in a human being, which test is accurate in an extremely high degree and which serves to distinguish between active and inactive forms of the disease.

A further object of the present invention is to provide a test for the diagnostic determination of tuberculosis which comprises intradermally injecting a human being with a proteinaceous substance which will respond allergically and produce pseudopodia upon the skin if the human being is afflicted with the disease of tuberculosis.

The present invention contemplates the provision of an improved diagnostic test for tuberculosis, together with the adjunctive preparation or antigen for carrying out the test, which antigen is derived from tissue not directly subjected to attack and/or destruction by the action of the tuberculosis bacteria, all directly attacked portions of the tissue of the animal being removed, whereby the resulting test is accurately determinative of the activity of the disease.

Numerous other objects and advantages will more fully appear during the course and progress of the following specification.

The present invention is based more specifically upon the theory that the tissue of an animal having the disease of tuberculosis contains a specific protein characteristic of that particular diseased condition and that, when an antigen is made up from an extract or solution containing the said specific tubercular protein and introduced intradermally into such an animal, the characteristic protein will respond allergically and produce pseudopodia. In other words, the allergic reaction is due to the fact that the antigen produced from the tissue of the tubercular animal contains a characteristic specific protein homologous to the specific tubercular protein in the system of the diseased animal.

More specifically, in accordance with the present invention, the present antigen is prepared from the tissue of an animal having the disease of tuberculosis by extracting the tissue or otherwise placing in solution a portion of said animal tissue so as to form a solution of the said bovine tubercular protein which is homologous to that in the diseased animal. By the term "tissue" is meant to include in general the portions of the animal organism coming within the usual definition of this term; for instance, the tissue going to make up the structure of the body, such, for example, as the muscles or the blood, including the various components thereof, but excluding various other liquids such as the digestive fluids and the like. With proteinaceous tissue which is difficultly soluble, it is preferred to form the antigen by extracting with a suitable extraction agent which will dissolve portions of the tissue including the desired characteristic protein.

According to the preferred procedure it has been found that an alkaline substance, such as an alkaline hydroxide, for example, provides a very good extraction agent. Equivalent products, while relatively inferior, may be produced by extracting the portions of the animal tissue with suitable acid extraction agents. Naturally, it is not desirable to employ an acid which will tend to "burn," digest or produce complete chemical destruction of the tissue components. To this end it has been found that an acid, such as hydrochloric acid, is suitable.

It is believed that it will be understood from the above disclosure that the antigen, whether extracted with an alkaline or acid substance, must subsequently be substantially neutralized so that it may be employed for intradermal injection in substantially neutral condition. The best results in accordance with the present invention are attained when the final antigen is neutralized and buffered to a pH of 6.9; that is, in a condition where it is substantially neutralized to mild acidity. In spite of this fact, improved results, in accordance with the present invention, may be obtained even though the pH vary slightly from this preferred pH of 6.9 at which the highest diagnostic accuracy is obtained. In general it may be said that the present invention is effective for diagnostically determining the presence of tuberculosis when neutralized to a pH at a range of from 6.7 to 7.0 and useful results have been attained within a range of from 6.5 to 7.1.

According to one illustrative method of preparing the antigen, guinea pigs or any other susceptible animals are inoculated with tubercle bacilli and allowed to revelop tuberculosis. This normally takes about 5 weeks. After the development of the tuberculosis, the animals are bled and the whole blood collected. The animals are sacrificed and an autopsy made to determine specifically the existence of tuberculosis. For the purpose of additionally checking the known facts the blood so collected is placed in sterilized containers and allowed to coagulate. I have found that 24 hours is a preferable time in which the coagulation is accomplished. After coagulation the serum is decanted and placed in a separate container.

The clot containing the fibrin is treated until all of the hemoglobin and serum are washed out. This is preferably accomplished by placing the clot containing the fibrin in bolting cloth which may be tied with a string or in any manner to keep the clot toggether. The cloth is then washed and squeezed until the hemoglobin and serum are washed out. The fibrin remaining in the bolting cloth is then placed in acetone solution to harden the fibrin. The volume of acetone selected is approximately twenty times that of the fibrin. The fibrin is left in this acetone preferably 12 hours or until the hardening is completed. It is then removed and placed in a fresh solution of acetone of substantially the same value.

After the second hardening process is completed the fibrin is removed and the acetone evaporated. This is preferably done by placing the fibrin in Petri dishes and subjecting it to a draft of air. The fibrin is then pulverized to substantially the consistency of talcum powder. The powder fibrin is then extracted in deci-normal sodium hydroxide in the proportions of substantially $\frac{1}{10}$ths of a gram of fibrin to substantially 10 cubic centimeters of the deci-normal sodium hydroxide. This is carried on for preferably 24 hours. The deci-normal sodium hydroxide is made up in the proportion of approximately 4 grams of hydroxide C. P. to 1 liter of distilled water in a volumetric flask. The ground fibrin is first ground to a smooth paste in a mortar with the first few centimeters of sodium hydroxide, the rest of the said hydroxide being added slowly. The fibrin is carefully mixed with the solution so that a perfectly smooth suspension of the fibrin in the sodium hydroxide is obtained. The extract of the fibrin and sodium hydroxide is preferably then poured into large test tubes or preferably a straight sided cylinder and allowed to stand for approximately 24 hours.

The volume of the supernatant solution should be measured with a sterilized graduate. After 24 hours the extract is centrifuged for approximately 5 minutes or until the tissue or fibrin settles on the bottom. The liquid part is placed in a sterilized vessel of a volume preferably more than twice that of the extract or liquid so as to allow for the addition of an acid and buffer solution for neutralizing the alkaline extract. The acid and buffer solution for neutralizing the alkaline extract comprises 2.270 grams of anhydrous C. P. primary potassium phosphate ($KH_2PO_4$) and approximately 4.235 cubic centimeters of concentrated hydrochloric acid (HCl C. P.; 35% solution) made up to 1 liter with distilled water in a volumetric flask. This gives a solution which is .05 normal with respect to primary potassium phosphate, and which is .05 normal with respect to hydrochloric acid.

The amount of acid and buffer solution just described is added to the alkaline extract which has been decanted and placed in a sterilized vessel, as hereinbefore described. The acid and buffer solution should be added slowly and the solutions carefully stirred or gently agitated while the acid and buffer solution is being added. After an equal amount of the acid and buffer solution has been thus added, a few more cubic centimeters of the acid and buffer solution may be added. The resultant solution should then be tested to see if the neutralization is nearing the end point. This testing should be repeated frequently to make sure that the titration does not go past the end point, which is pH 6.9 for this process. If the resultant solution is made too acid, the protein of the antigen will be precipitated. The antigen should be checked electrometrically, if possible, and if this is not possible it may be checked against a standard solution of pH 6.9 using the spot plate method with brom-thymol-blue as an indicator.

The standard solution is made of anhydrous primary potassium phosphate, $\frac{1}{15}$ molar, 9.078 grams of the pure salt, in 1 liter of freshly distilled water in a volumetric flask, and anhydrous secondary sodium phosphate, $\frac{1}{15}$ molar, 9.472 grams of pure salt, made up to 1 liter with freshly distilled water in a volumetric flask. These solutions are combined in a Pyrex container in the proportion of 4.9 parts of the solution of primary potassium phosphate to 5.1 parts of the solution of secondary sodium phosphate. The mixture of these solutions has a pH of 6.9.

When the end point of the titration has been reached, as ascertained by the electrometric method, or by the matching of the antigen to the standard solution of pH 6.9, a preservative which consists of a solution of tricresol and glycerin C. P. in the proportion of 1 part of tricresol to 2 parts of glycerin may be added.

The total volume of the finished antigen is calculated, that is, the volume including the alkaline extract and the added volume of the acid and buffer mixture. To each 10 cubic centimeters of antigen there are added two drops of the tricresol and glycerin preservative from a capillary pipette having an internal diameter of 1 millimeter at the dropping end. A sterile stopper should be placed on the bottle containing the antigen and the solution should be agitated thoroughly so that the preservative will be evenly dispersed throughout the antigen. A rubber stopper of the cap type is preferably used for the bottle containing the antigen so that the solution may be withdrawn by means of a syringe and needle and the bottle need not be opened. After the preservative has been added to the antigen and the solution thoroughly shaken the antigen may then be drawn from the large container by means of a Pyrex syringe and put into small vials for use. For convenience these vials may be of 5 cubic centimeters capacity. The antigen is then ready for intradermal injection for the determination of tuberculosis.

*Test*

One tenth of 1 cubic centimeter of the above antigen is drawn off into a small syringe to which there is attached a very fine short needle. The antigen is injected intradermally, after first sterilizing and treating the surface of the patient's skin and rendering it perfectly dry. The injection is performed by stretching the skin with one hand and injecting the antigen intradermally, the injection being made by the usual intradermal method. In positive cases, that is, in cases where the patient examined is tubercular, a slight area of inflammation will be noticed surrounding the small bubble termed a "bleb," which occurs from the injection, and pseudopods will form. Pseudopods are radial elongations extending outwardly from the edges of the bleb. In negative cases, that is, in cases where the patient is not tubercular, no pseudopod formation will take place.

The following is another alternative preferred method of preparing an antigen in accordance with the present invention from the blood serum and more specifically from the serum globulins. According to this specific illustrative method of procedure, the decanted blood serum produced in accordance with the above example is treated with a 33⅓ per cent solution of ammonium sulphate to precipitate the serum globulins. The globulins thus precipitated are used in the proportion of 1 to 50 in normal salt solution buffered to a pH of 6.9.

It will be noted that, when proceeding in accordance with the specific example immediately supra, the globulins are directly dissolved or dispersed in the salt solution for which reason it is not necessary to perform a specific extraction step. Other portions of the animal tissue, for example, the blood fibrin hereinbefore described, are not readily soluble in an ordinary neutral solution for which reason extraction thereof is indicated.

It is important to note, however, that, if desired, the globulins may be treated to form the antigen by substantially the same process as that employed in synthesizing the antigen from the blood fibrin, namely, by extraction thereof, for example, using sodium hydroxide. Antigens formed from the blood serum according to this process have been found to have a high degree of accuracy in the determination of tuberculosis.

According to the present invention the different globulins may be either separated and used individually, or may be employed collectively as they exist in the blood serum, for instance. In general the present test is highly accurate in determining the existence of active tuberculosis regardless of which particular globulin may be employed for forming the antigen. For example, the antigen has been made in the aforesaid manner from the euglobulins separated in known manner from the other globulins with which they normally exist. Similarly antigens prepared from the pseudo-globulins alone have been found to possess the improved properties in accordance with the present invention which render them capable of use in the determination of tuberculosis. These globulins may be separated by methods which are well known in the art.

According to a yet further specific method of proceeding in accordance with the present invention, the present antigen may be formed from the relatively solid tissue forming the animal body. When proceeding in accordance with this method, the animal is slaughtered and autopsied, as hereinbefore described. When guinea pigs are employed for this purpose the skin is first removed so that the fur is taken off and the tissue is cut up into small pieces and washed thoroughly in water to remove the blood. In accordance with the present specific embodiment, it is preferred that the tissue employed consist of the muscles and to this end these portions are dissected out and fat removed from them. It is to be understood that the blood and the fat are not removed from the muscular portions because they produce an inferior antigen. On the other hand, in accordance with the present invention it has been found that in general all of the animal tissue may be employed to form such an antigen.

When working with a muscular tissue, for example, which contains blood and other different forms of tissue, the solutions to be handled may tend to become muddy and turbulent whereas, when clean pieces of tissue of the same type are employed, the process is simplified and the final, as well as the intermediate, products are relatively clear and thus more readily handled during subsequent treatments.

The muscles of the animal body, cut up into small pieces and thoroughly washed free of blood as above, may subsequently be treated identically in accordance with the process described in connection with the first illustrative example, namely, that involving the production of the antigen from the blood fibrin. More specifically, the small pieces of tissue are placed in acetone solution for dehydration. The volume of acetone and the time of treatment may be the same as that described in the aforementioned example.

After repeated treatment with acetone the product is removed and the acetone evaporated by placing the tissue in a dish and subjecting it to a draft of air until completely dry. The dry product is then pulverized to substantially the consistency of talcum powder and extracted with deci-normal sodium hydroxide, separated, filtered, neutralized and buffered in the previously described manner. It will be understood that the final product is likewise treated with a preservative and may be stored in small vials for use.

The present test for tuberculosis is founded upon the theory that a characteristic protein, developed within an animal suffering from the disease of tuberculosis, is carried, probably from the injected portions or tissues of the body, throughout substantially the entire system. When the protein, prepared in the aforementioned manner, is injected intradermally, the homologous character of the prepared protein or serum results in the formation of pseudopods when the individual injected suffers from tuberculosis in accordance with the laws of protein desensitization or allergy. Accordingly, therefore, the present antigen does not depend upon the presence of bacteria, the antigen used in the test being completely free of bacteria or of any bacterial products and dependent for its novel result upon the existence therein of a specific protein homologous to the specific protein characteristic of the disease of tuberculosis.

It is to be understood that in making the present antigen the diseased portions of the tissue, that is, tissue which is directly attacked and degraded by the onslaught of the bacteria, are removed and discarded. That is to say, the present antigen or sensitizing agent is formed from only the dissected portions of the tissue which are not attacked. In this, among other points, the product accordingly differs from the known tuberculin products which are formed from bacteria or bacterial products.

While the production of the antigen has been hereinbefore illustrated by reference to its specific production from blood fibrin, muscles and globulins, it will be understood that the scope of the invention is not limited to the illustrative embodiments. Other portions of the tissue of the animal body, such, for example, as the marrow of the bone and other connective tissue, have been found to produce an antigen having a high degree of utility for the present purposes. For this reason it will be understood that the present invention is intended to include the production of the present antigen from the tissue in general of the diseased animal.

It is to be further understood throughout this specification that the word "animals" is taken in its zoological denotation and is, therefore, meant to include humans as well as inarticulate beasts.

The term "antigen" as used in the instant specification and claims is to be construed as covering a sensitizing or diagnostic agent or reactant capable of resulting in a skin reaction by pseudopod formation when the antigen is injected intradermally into an animal having tuberculosis, as compared with the use of such a term as covering an agent containing or capable of creating anti-bodies. In other words, so far as is known, the present test is not related to the existence of anti-bodies but depends upon a specific protein which is homologous to the specific protein characteristic of tuberculosis and thus operative to cause an allergic skin reaction when introduced locally into the skin of an animal having tuberculosis.

The test described in the present invention is of considerably increased utility over previous tuberculin tests which were based on the acquired immunity of a patient. Accordingly, a patient having once contracted tuberculosis will always react positively to these prior tests even though the disease has been rendered inactive. So, too, in cases of tubercular meningitis and miliary tuberculosis, where there is no acquired immunity, the results will normally be negative. On the other hand, my antigen and test do not react in accordance with the acquired immunity of the patient but depend solely upon the presence of active tuberculosis in the individual. For this reason my test gives a positive reaction in the case of those afflicted with active tuberculosis and a negative reaction in the case of those who are free from tuberculosis regardless in either instance of the existence of acquired immunity.

Preferred portions of the animal organism suitable for preparing the present antigen may be generically described as mesodermal tissue, namely, the tissue related to the mesoderm or mesoblast, to-wit, the vascular and muscular systems.

The invention is hereby claimed as follows:

1. An antigen specific to the diagnostic determination of tuberculosis by intradermal injection comprising a substantially neutralized alkaline hydroxide extract of fibrin taken from the blood of an animal or human having tuberculosis.

2. An antigen specific to the diagnostic determination of tuberculosis by intradermal injection comprising a neutralized, inorganic, alkaline hydroxide extract of fibrin taken from the blood of an animal or human having tuberculosis, said extract having a pH of substantially 6.9.

3. An antigen specific to the diagnostic determination of tuberculosis by intradermal injection comprising a neutralized sodium hydroxide extract of fibrin from the blood of an animal or human having tuberculosis.

4. The process of making an antigen for intradermal use to determine diagnostically if tuberculosis exists which consists in extracting fibrin from the blood of an animal or human having tuberculosis with an inorganic, alkaline hydroxide extraction agent, separating the extract, and neutralizing the extract.

5. The process of making an antigen for intradermal use to determine diagnostically if tuberculosis exists which consists in obtaining an inorganic, alkaline extract of fibrin from the blood of an animal or human having tuberculosis, and then buffering and neutralizing to approximately a pH of 6.9.

6. The process of making an antigen for intradermal use to determine diagnostically if tuberculosis exists which consists in extracting fibrin from the blood of an animal or human having tuberculosis with a sodium hydroxide extraction agent, separating the extract, and neutralizing the extract with potassium phosphate and hydrochloric acid.

7. An antigen specific to the diagnostic determination of tuberculosis by intradermal injection comprising a substantially neutralized alkaline hydroxide extract of muscle tissue taken from the body of an animal having tuberculosis.

8. An antigen specific to the diagnostic determination of tuberculosis by intradermal injection comprising a substantially neutralized, inorganic, alkaline hydroxide extract of muscle tissue taken from the body of an animal having tuberculosis, said extract having a pH of substantially 6.9.

9. An antigen specific to the diagnostic determination of tuberculosis by intradermal injection comprising a substantially neutralized sodium hydroxide extract of muscle tissue from the body of an animal having tuberculosis.

10. An antigen specific to the diagnostic determination of tuberculosis by intradermal injection comprising a neutralized sodium hydroxide extract of muscle tissue taken from the body of an animal or human having tuberculosis, said extract having a pH of about 6.9.

11. The process of making an antigen for intradermal use to determine diagnostically if tuberculosis exists which consists in extracting muscle tissue from the body of an animal having tuberculosis with an inorganic, alkaline hydroxide extraction agent, separating the extract, and neutralizing the extract.

12. The process of making an antigen for intradermal use to determine diagnostically if tuberculosis exists which consists in obtaining an inorganic, alkaline extract of muscle tissue from the body of an animal having tuberculosis, and then buffering and substantially neutralizing to approximately a pH of 6.9.

13. The process of making an antigen for intradermal use to determine diagnostically if tuberculosis exists which consists in extracting muscle tissue from the body of an animal having tuberculosis with a sodium hydroxide extraction agent, separating the extract, and substantially neutralizing the extract with potassium phosphate and hydrochloric acid.

14. An antigen to determine diagnostically the existence of tuberculosis comprising an extract of muscle tissue obtained from an animal having the disease of tuberculosis, and being adapted for intradermal injection, which extract contains a specific protein homologous to the specific tuberculosis protein of an animal having tuberculosis and which produces a skin reaction by pseudopod formation when the antigen is injected intradermally into an animal afflicted with tuberculosis.

15. An antigen to determine diagnostically the existence of tuberculosis comprising an extract of blood fibrin obtained from an animal having the disease of tuberculosis, and being adapted for intradermal injection, which extract contains a specific protein homologous to the specific tuberculosis protein of an animal having tuberculosis and which produces a skin reaction by pseudopod formation when the antigen is injected intradermally into an animal afflicted with tuberculosis.

16. An antigen specific to the diagnostic determination of tuberculosis by intradermal injection comprising a substantially neutralized alkaline hydroxide extract of tissue from the body of an animal having tuberculosis and containing a specific protein homologous to the specific protein characteristic of tuberculosis, and which produces a skin reaction by pseudopod formation when injected intradermally into an animal having tuberculosis.

17. The process of making an antigen for intradermal use to determine diagnostically the existence of active tuberculosis which comprises extracting with an alkaline hydroxide extraction agent a tissue from the body of an animal having tuberculosis, and containing a specific protein homologous to the specific protein characteristic of tuberculosis, separating the extract, and neutralizing the extract.

18. An antigen to determine diagnostically the existence of tuberculosis comprising an extract of a tissue from the body of an animal having tuberculosis, and containing a specific protein homologous to the specific protein characteristic of tuberculosis, which extract is adapted for intradermal injection and which produces an allergic skin reaction by pseudopod formation when the antigen is injected intradermally into an animal having tuberculosis.

BENJAMIN GRUSKIN.

CERTIFICATE OF CORRECTION.

Patent No. 2,204,272.                                    June 11, 1940.

BENJAMIN GRUSKIN.

It is hereby certified that error appears in the printed specification of the above numbered patent requiring correction as follows: Page 1, first column, line 2, after the word "sensitizing" and before the comma insert --agent--; page 1, first column, line 22, for "antradermal" read --intradermal--; page 2, first column, line 8, for "revelop" read --develop--; line 26, for "toggether" read --together--; page 4, second column, line 75, and page 5, first column, line 10-11, claims 14 and 15 respectively, for "tuberculosis" read --tuberculous--; and that the said Letters Patent should be read with this correction therein that the same may conform to the record of the case in the Patent Office.

Signed and sealed this 6th day of August, A. D. 1940.

(Seal)

Henry Van Arsdale,
Acting Commissioner of Patents.